(12) United States Patent
Barton et al.

(10) Patent No.: US 8,917,302 B2
(45) Date of Patent: Dec. 23, 2014

(54) APPARATUS AND METHOD TO DISPLAY INFORMATION USING AN INFORMATION LAYER LAMINATE

(75) Inventors: Michael J. Barton, Apex, NC (US); William R. Duffy, III, Raleigh, NC (US); Michael Kennedy Trivette, Morrisville, NC (US); David Thomas Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1438 days.

(21) Appl. No.: 12/036,955

(22) Filed: Feb. 25, 2008

(65) Prior Publication Data

US 2009/0213149 A1 Aug. 27, 2009

(51) Int. Cl.
| | | |
|---|---|---|
| *B41J 2/435* | (2006.01) | |
| *G01D 15/14* | (2006.01) | |
| *G11B 7/24* | (2013.01) | |
| *G11B 7/24044* | (2013.01) | |
| *B44C 3/00* | (2006.01) | |
| *G11B 7/0065* | (2006.01) | |
| *G11B 7/24094* | (2013.01) | |
| *B41M 5/24* | (2006.01) | |
| *G11B 23/40* | (2006.01) | |
| *B41M 5/34* | (2006.01) | |

(52) U.S. Cl.
CPC .............. *B41M 5/24* (2013.01); *G11B 7/24044* (2013.01); *B44C 3/005* (2013.01); *G11B 7/0065* (2013.01); *G11B 7/24094* (2013.01); *G11B 23/40* (2013.01); *B41M 5/34* (2013.01)
USPC ........................................ 347/224; 369/275.1

(58) Field of Classification Search
CPC ........................... G11B 7/24094; G11B 23/40
USPC ................. 347/224, 229, 234, 240, 248, 251; 369/275.1
See application file for complete search history.

(56) References Cited

U.S. PATENT DOCUMENTS

| | | | | |
|---|---|---|---|---|
| 4,732,410 | A * | 3/1988 | Holbein et al. ................. | 283/67 |
| 5,854,175 | A | 12/1998 | DeBoer et al. | |
| 6,778,205 | B2 * | 8/2004 | Anderson et al. ............. | 347/251 |
| 6,844,889 | B2 * | 1/2005 | Bronson ....................... | 347/224 |
| 7,172,991 | B2 | 2/2007 | Anderson et al. | |
| 7,763,179 | B2 * | 7/2010 | Levy et al. ...................... | 216/94 |

(Continued)

OTHER PUBLICATIONS

Stewart et al., "Multipass laser ablation of three coloured ink from a paper substrate," Laser Processing Research Centre, Department of Mechanical, Aerospace and Manufacturing Engineering, University of Manchester Institute of Science and Technology (UMIST), PO Box 88, Manchester M60 1QD, UK, De La Rue Limited, Overton Mill, Overton, Hants, UK, Mar. 27, 2001.

(Continued)

*Primary Examiner* — Uyen Chau N Le
*Assistant Examiner* — John M Bedtelyon
(74) *Attorney, Agent, or Firm* — Dale F. Regelman; Quarles & Brady LLP

(57) ABSTRACT

A method to display information using an information layer laminate comprising at least three color layers each comprising a different color by selectively removing one or more portions of a first color layer to display portions of a second color layer, and selectively removing one or more portions of a first color layer and one or more portions of a second color layer to display portions of a third color layer.

14 Claims, 18 Drawing Sheets

(56) References Cited

U.S. PATENT DOCUMENTS

2004/0141046 A1    7/2004   Hanks
2004/0240369 A1*   12/2004   Park .............................. 369/103
2005/0053870 A1    3/2005   Willard et al.

OTHER PUBLICATIONS

Redwagon, "Lightscribe Drive and Media", Feb. 17, 2006.
Perenson et al., "Lightscribe Simplifies DVD Labeling", PCWorld, Jan. 12, 2004.

* cited by examiner

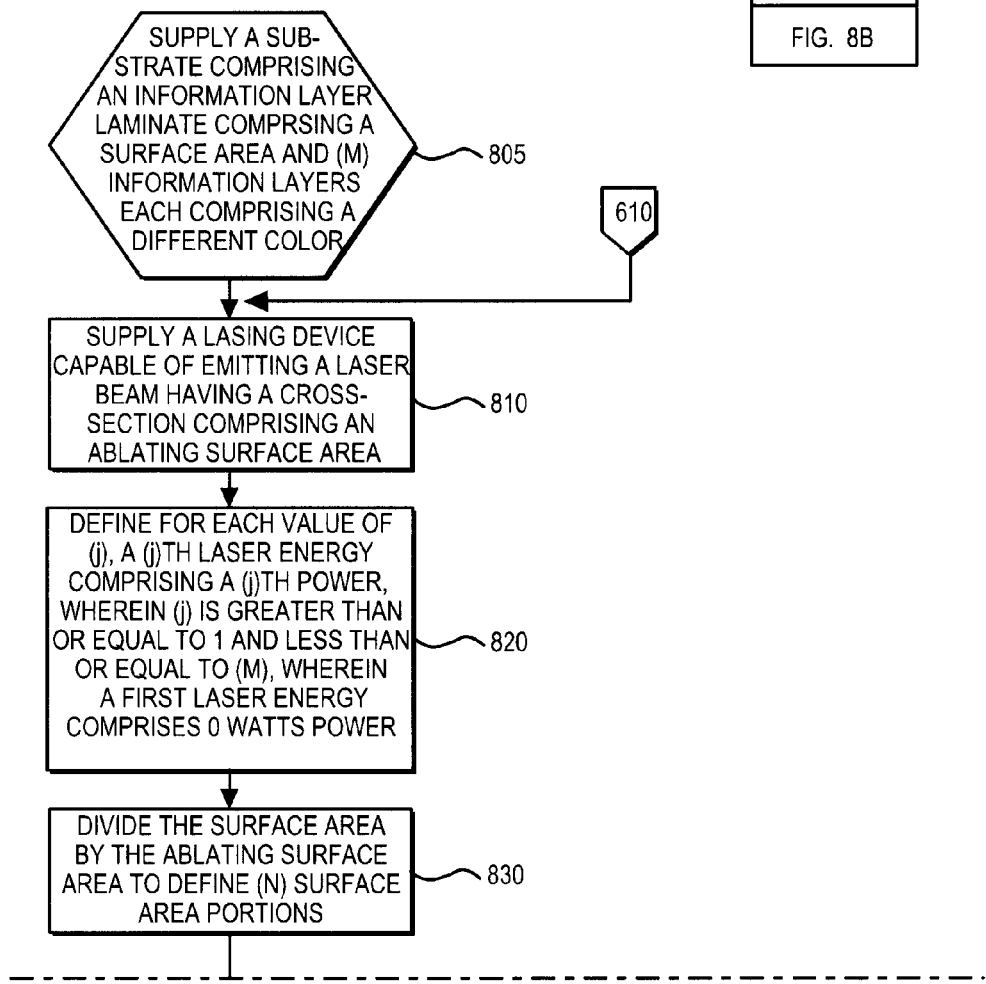

APPARATUS AND METHOD TO DISPLAY INFORMATION USING AN INFORMATION LAYER LAMINATE

FIELD OF THE INVENTION

This invention relates to an apparatus and method to display information using an information layer laminate.

BACKGROUND OF THE INVENTION

Lasing devices are used to encode and decode information in and from various kinds of data storage media. Optical drives, including CD and DVD drives, detect variations in various optical properties in the surface of an optical data storage layer. Such optical drives direct laser light beam onto that surface and detect either the presence or absence of a corresponding reflected beam.

In holographic information storage an entire page of information is stored at once as an interference pattern within a thick, photosensitive material comprising a holographic data storage layer. This is done by intersecting two coherent laser beams within the storage layer. The first, called the data beam, contains the information to be stored; the second, called the reference beam, is designed to be simple to reproduce, for example a simple collimated beam with a planar wavefront.

The resulting interference pattern causes chemical and/or physical changes in the photosensitive medium: a replica of the interference pattern is stored as a change in the absorption, refractive index, or thickness of the photosensitive medium.

When the stored interference pattern is illuminated with one of the two waves that were used during recording, some of this incident light is diffracted by the stored interference pattern in such a fashion that the other wave is reconstructed. Illuminating the stored interference pattern with the reference beam reconstructs the data beam, and vice versa.

SUMMARY OF THE INVENTION

Applicants' invention comprises an apparatus and method to display information using an information layer laminate comprising at least three color layers each comprising a different color. The method selectively removes portions of a first color layer to display portions of a second color layer. The method further selectively removes portions of a first color layer and a second color layer to display portions of a third color layer.

In certain embodiments, Applicants' information layer laminate comprises a visible portion of an information storage assembly comprising a data storage medium. In certain embodiments, a lasing device used to encode and/or decode information in and from the data storage medium is also used to ablate portions of one or more color layers comprising Applicants' information layer laminate to visually display information relating to the information storage assembly.

BRIEF DESCRIPTION OF THE DRAWINGS

The invention will be better understood from a reading of the following detailed description taken in conjunction with the drawings in which like reference designators are used to designate like elements, and in which:

FIG. 8A is a flow chart summarizing certain additional steps of Applicants' method.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The invention is described herein in embodiments wherein a top of an information layer laminate comprises a visible portion of an information storage assembly. This description should not be taken to limit Applicant's invention to information storage assemblies. Rather, Applicants' color layer laminate, and method to display information using same, can be implemented in embodiments that do not comprise storage media, such as for example and without limitation commercial signage, employee badges, and the like.

Figure 1:
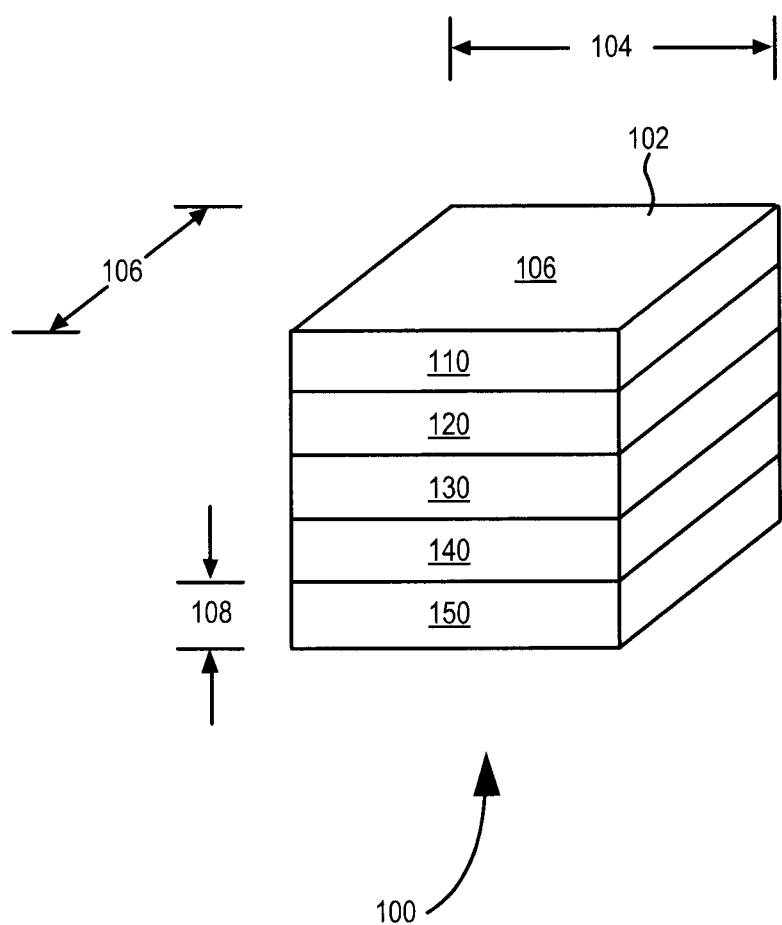
FIG. 1 is perspective view of one embodiment of Applicants' information layer laminate.

FIG. 1 shows Applicants' information layer laminate 100. In the illustrated embodiment of FIG. 1, information layer laminate 100 comprises 5 layers, namely color layer 110, color layer 120, color layer 130, color layer 140, and color layer 150. Color layer 110 comprises top surface 102 comprising surface area 160. In the illustrated embodiment of FIG. 1, each layer of information layer laminate comprises a length 104, width 106, and thickness 108. In certain embodiments, thickness 108 is between about 1 mm and about 10 mm.

Length 104 and width 106 can vary depending on the implementation of information layer laminate 100. As an example and without limitation, in certain embodiments information layer laminate 100 is disposed in a data storage medium or a housing/cassette for a data storage medium. In other embodiments, information layer laminate comprises a portion of, or all of, an employee badge.

In the illustrated embodiment of FIG. 1, Applicants' information layer laminate 100 comprises a parallelepiped comprising a square or rectangular cross-section. In other embodiments, Applicants' information layer laminate comprises (M) layers, wherein (M) is greater than 2, and may comprise a circular cross-section, a triangular cross-section, a pentagonal cross-section, a hexagonal cross-section, and the like.

As a general matter, Applicants' color layer laminate comprises at least three layers. In certain embodiments, each of three color layers disposed in Applicants' color layer laminate comprises a different color. In certain embodiments, each of three color layers disposed in Applicants' information layer laminate comprises a different primary color.

Primary colors are sets of colors that can be combined to make a useful range of colors. For human applications, three are often used. For additive combination of colors, as in overlapping projected lights or in CRT displays, the primary colors normally used are red, green, and blue. For subtractive combination of colors, as in mixing of pigments or dyes, such as in printing, the primaries normally used are magenta, cyan, and yellow.

In certain embodiments, each of three color layers disposed in Applicants' information layer laminate comprises a different color selected from the group consisting of red, green, and blue. By "blue," Applicants mean visible light comprising one or more wavelengths between about 440 and about 490 nanometers. By "green," Applicants mean visible light comprising one or more wavelengths between about 520 and about 570 nanometers. By "red," Applicants mean visible light comprising one or more wavelengths between about 625 and about 750 nanometers.

In certain embodiments, each of three color layers disposed in Applicants' information layer laminate comprises a different color selected from the group consisting of magenta, cyan, and yellow. By "magenta," Applicants mean visible light comprising less power in yellowish-green wavelengths than in blue and red wavelengths (complements of magenta have wavelength 500-530 nm. By "cyan," Applicants mean visible light obtained by mixing equal amounts of green and blue light or the removal of red from white light. As such, cyan is the complement of red. By "yellow," Applicants mean visible light comprising one or more wavelengths between about 570 and about 580 nanometers.

Figure 2A:
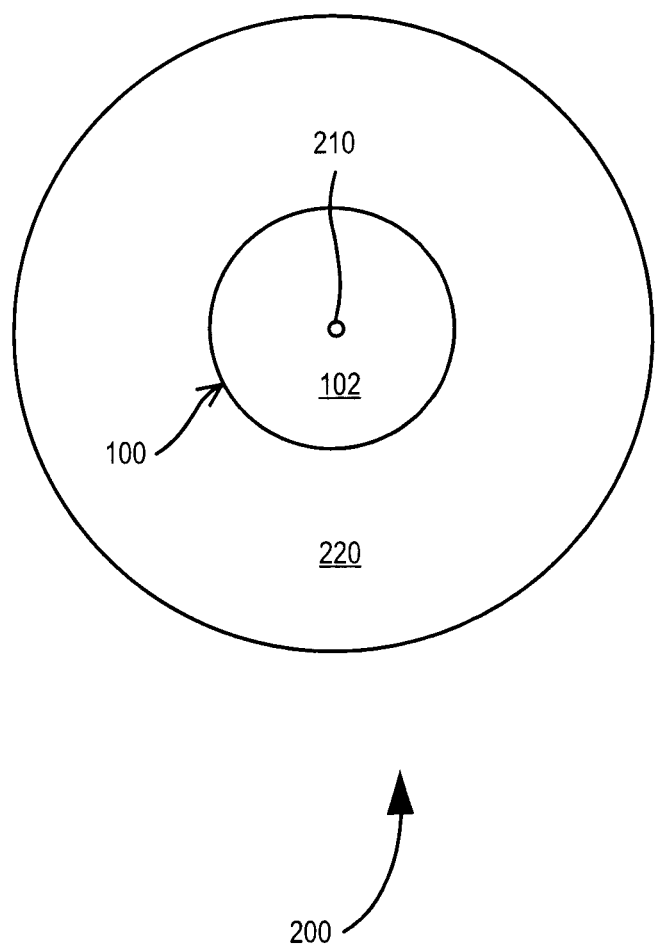
FIG. 2A is a top view of Applicants' information storage assembly comprising the information layer laminate of FIG. 1 in combination with a data storage medium.

FIG. 2A illustrates information storage assembly 200. Information storage assembly 200 comprises center point 210, Applicants' information layer laminate 100, and data storage medium 220. In certain embodiments, data storage medium 220 is selected from the group consisting of a magnetic storage medium, an optical storage layer an electronic storage medium, a holographic data storage medium, and combinations thereof.

Figure 2B:
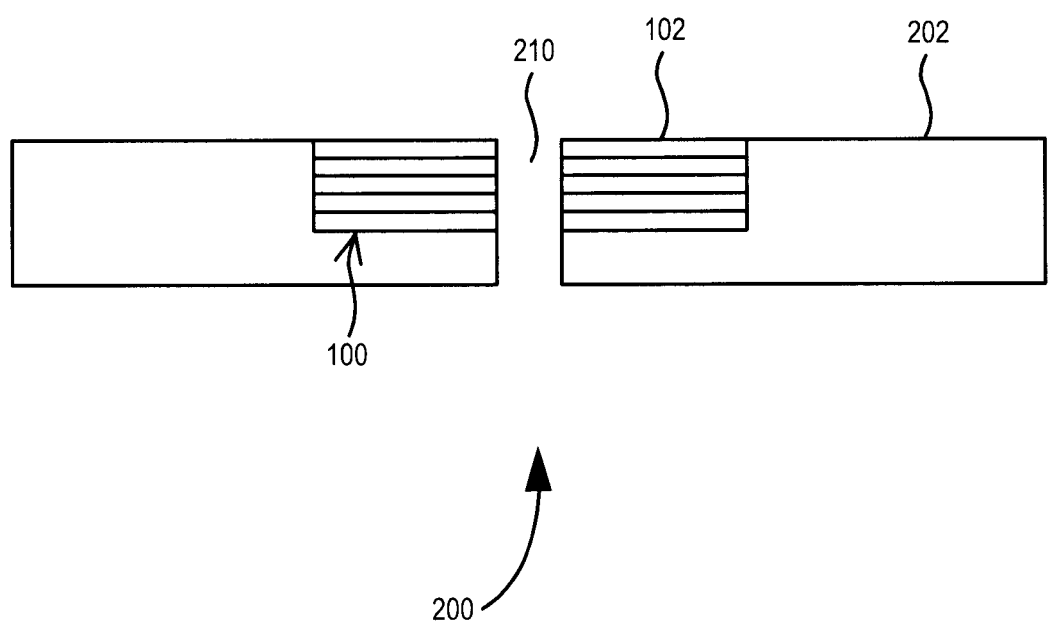
FIG. 2B is a cross-sectional view of the information storage assembly of FIG. 2A.

In the illustrated embodiment of FIG. 2B, Applicants' information layer laminate comprises five layers, wherein each layer comprises a different color. In the illustrated embodiment of FIG. 2B, top surface 102 of information layer laminate 100 is contiguous with top layer 202 of data storage medium 220.

In certain embodiments, three of the five color layers each comprises a different primary color, wherein one of the remaining layers comprises a black color and wherein the other remaining color layer comprises a white color. By a color layer that "comprises a black color," Applicants mean a color layer that does not emit or reflect light comprising any wavelengths in the visible spectrum. By a color layer that "comprises a white color," Applicants mean a color layer that emits or reflects light comprising a plurality of colors in the visible spectrum.

Figure 3A:
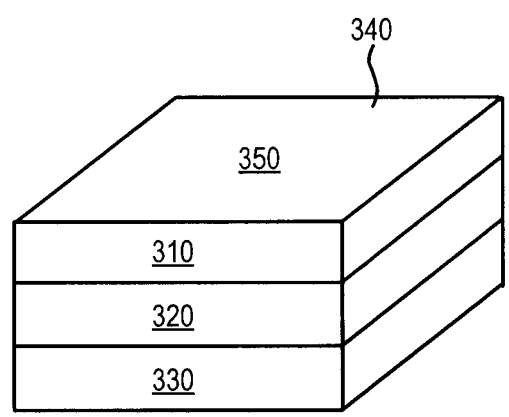
FIG. 3A is a perspective view of a second embodiment of Applicants' information layer laminate.
Figure 3A:
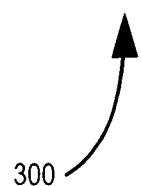
Figure 6:
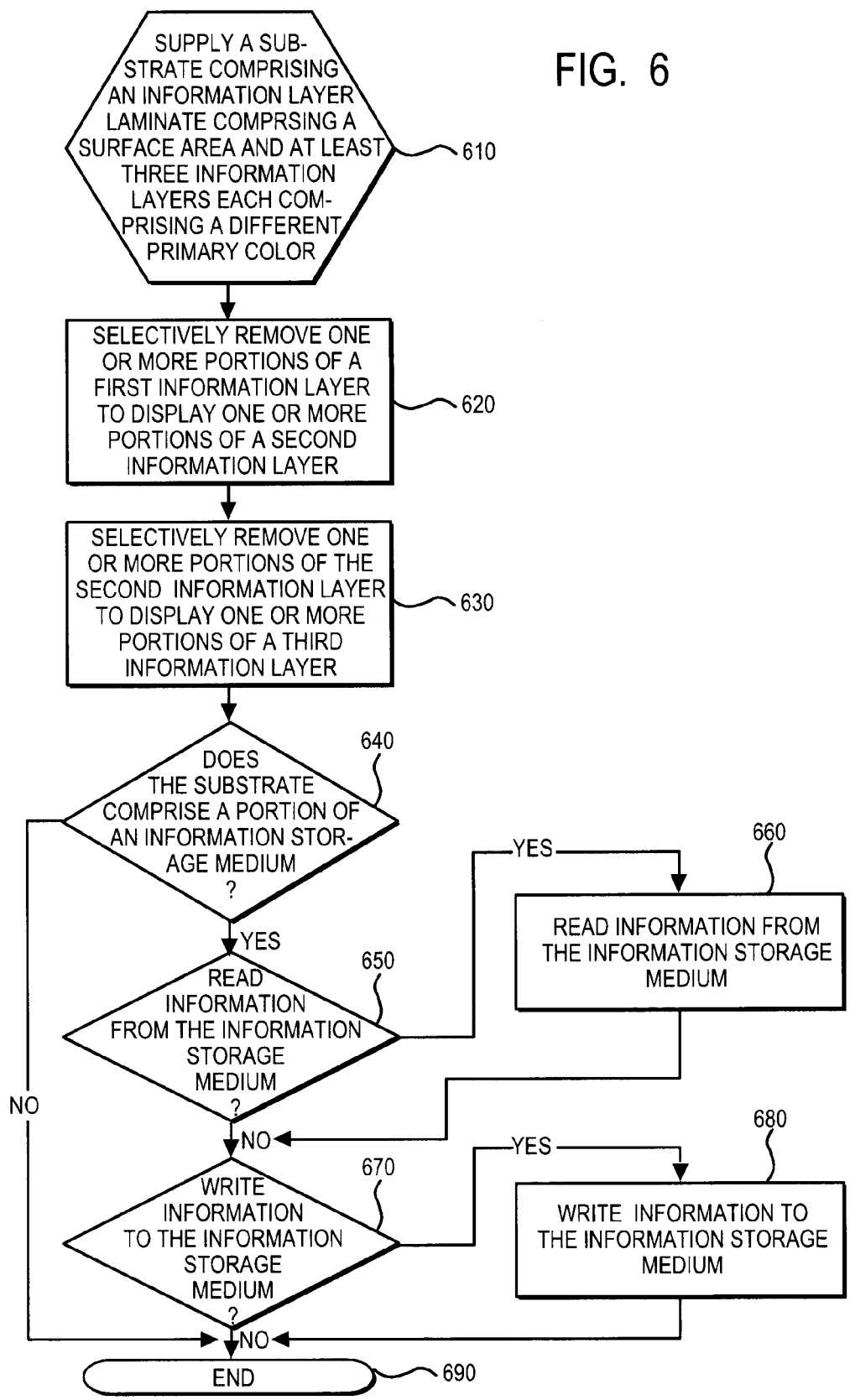
FIG. 6 is a flow chart summarizing the steps in Applicants' method.

Applicants' invention comprises a method to display information using Applicants' color layer laminate. Referring now to FIG. 6, in step 610 the method supplies a substrate, such as information storage assembly 100, comprising Applicants' information layer laminate, wherein that information layer laminate comprises at least three layers, and wherein each of those three layers comprises a different color. For example and referring now to FIG. 3A, Applicants' information layer laminate 300 comprises three layers, namely color layer 310 comprising a first color, color layer 320 comprising a second color, and color layer 330 comprising a third color, wherein each of the first color, the second color, and the third color, differ from one another.

In step 620, the method selectively removes one or more portions of color layer 310 to display one or more portions of color layer 320. Instep 630, the method selectively removes one or more portions of color layer 310 and color layer 320 to display one or more portions of color layer 330. Portions of color layer 310 that are not removed continue to display first color layer 310.

Applicants' method of FIG. 6 allows information layer laminate 300 to visually display one or more text elements in combination with one or more design elements, using three colors. In step 640, the method determines if the substrate of step 610 comprises an information storage assembly. If the substrate of step 610 does not comprise an information storage assembly, then the method transitions to step 690 and ends.

Alternatively, if the substrate of step 610 does comprise an information storage assembly, then the method transitions from step 640 to step 650 wherein the method determines whether to read information from a data storage medium disposed in that information storage assembly.

If the method determines in step 650 not to read information, then the method transitions from step 650 to step 670.

Alternatively, if the method determines in step 650 to read information, then the method transitions from step 650 to step 660 wherein the method reads information from a data storage medium disposed in the information storage assembly.

The method transitions from step 660 to step 670, wherein the method determines whether to write information to a data storage medium disposed in an information storage assembly. If the method determines in step 670 not to write information, then the method transitions from step 670 to step 690, and ends. Alternatively, if the method determines in step 670 to write information, then the method transitions from step 670 to step 680 wherein the method writes information to a data storage medium disposed in the information storage assembly.

In certain embodiments, steps 620, 630, 660, and 680, are performed using one drive apparatus. In certain embodiments, steps 620, 630, 660, and 680, are performed using one lasing device disposed in a drive apparatus.

In certain embodiments, drive apparatus 400 (FIGS. 4A, 4C, 4D) performs step 620 and/or 630. In certain embodiments, drive apparatus 402 (FIG. 4B) performs step 620 and/or 630. Drive apparatus 400 or 402 are used with Applicants' information storage assembly 200 (FIGS. 2A, 2B), wherein data storage medium 220 (FIG. 2A) comprises a holographic data storage medium.

In certain embodiments, drive apparatus 500 (FIGS. 5A, 5B, 5C) performs step 620 and/or 630. Drive apparatus 500 is used with Applicants' information storage assembly 200 (FIGS. 2A, 2B), wherein data storage medium 220 (FIG. 2A) comprises an optical data storage layer.

Figure 4A:
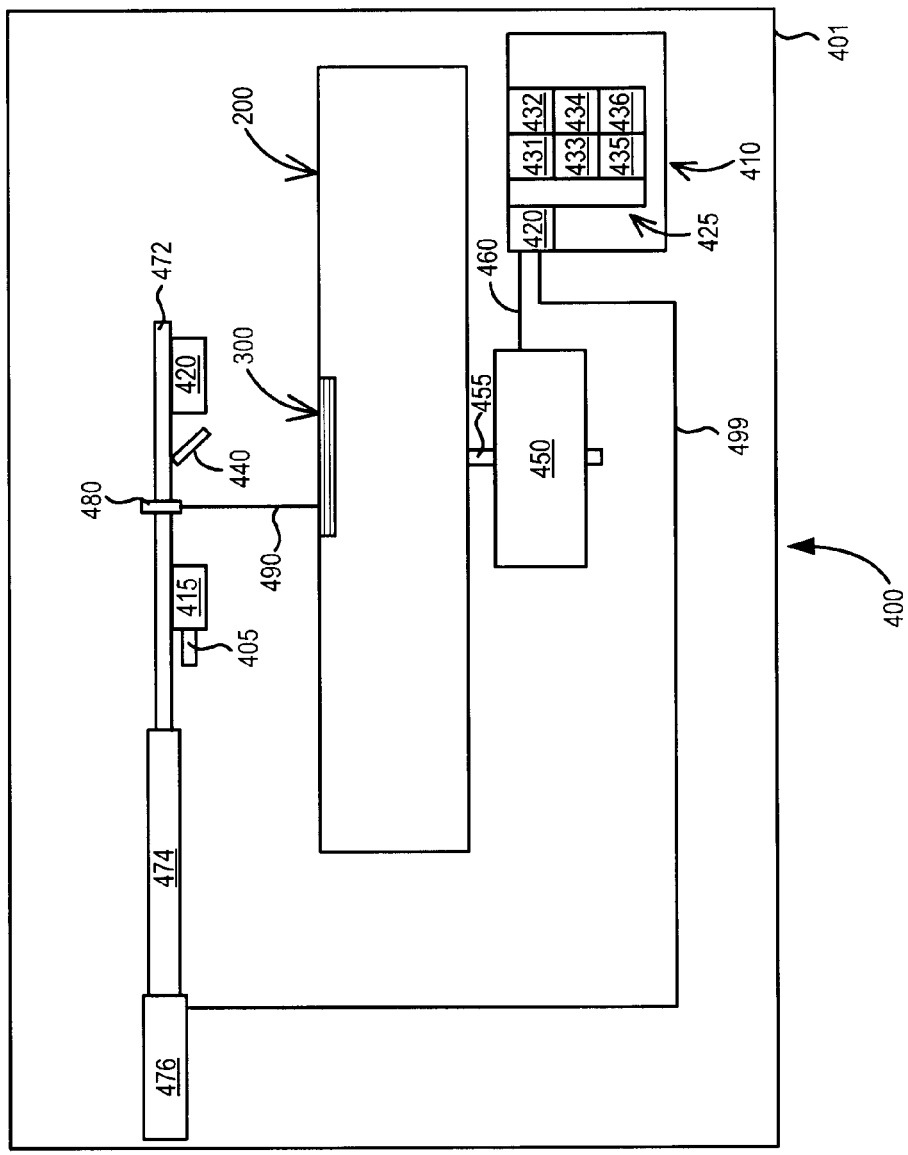
FIG. 4A is block diagram showing one embodiment of Applicants' drive apparatus using Applicants' method to display information using Applicants' information layer laminate.

Referring now to FIG. 4A, drive apparatus 400 comprises housing 401, first lasing device 405 (FIGS. 4A, 4B, 4C, 4D), beam splitter 415 (FIGS. 4A, 4B, 4C, 4D), reflective spatial light modulator 440 (FIGS. 4A, 4B, 4C, 4D), optical sensor 420 (FIGS. 4A, 4B, 4C, 4D), and second lasing device 490 (FIG. 4A). In the illustrated embodiment of FIG. 4A, information storage assembly 200 is releaseably attached to a drive mechanism comprising drive motor 450 and rotatable shaft 455.

In the illustrated embodiment of FIG. 4A, drive apparatus 400 (FIGS. 4A, 4C, 4D) further comprises member 472 slidably disposed within member 474, which is slidably disposed within optical head motor 476. Drive controller 410 (FIGS. 4A, 4B, 4C, 4D, 5A, 5B, 5C) can cause optical head motor 476 to extend members 474 and 472 outwardly. In the illustrated embodiment of 4A, first lasing device 405 (FIGS. 4A, 4B, 4C, 4D), beam splitter 415 (FIGS. 4A, 4B, 4C, 4D), optical sensor 420 (FIGS. 4A, 4B, 4C, 4D), reflective spatial light modulator 440 (FIGS. 4A, 4B, 4C, 4D), second lasing device 480 (FIGS. 4A, 4C, 4D), are disposed on member 472.

In the illustrated embodiment of FIG. 4A, drive apparatus 400 (FIGS. 4A, 4B, 4C, 4D) further comprises drive controller 410 (FIGS. 4A, 4B, 4C, 4D, 5A, 5B, 5C) which communicates with drive motor 450 via control line 460 and optical head motor 476 via control line 499. In certain embodiments, drive controller 410 comprises processor 420 and memory 425. In the illustrated embodiment of FIG. 4A, memory 425 comprises instructions 436 encoded therein, first laser energy 431 encoded therein, second laser energy 432 encoded therein, third laser energy 433 encoded therein, fourth laser energy 434 encoded therein, and fifth laser energy 435 encoded therein.

FIG. 4A shows lasing device 480 directing laser beam 490 onto Applicants' information layer laminate, such as laminate 300 (FIG. 3A), to perform steps 620 (FIG. 6) and 630 (FIG. 6). By varying the output power of laser beam 490, and/or varying the time that laser beam 490 is directed onto a selected portion of, for example, information layer laminate 300, drive controller 410 can selectively cause lasing device 480 to ablate portions of first information layer 310 to display a portion of color layer 320, or to ablate a portion of both first color layer 310 and the underlying portion of second color layer 320 to display a portion of third color layer 330.

Figure 4B:
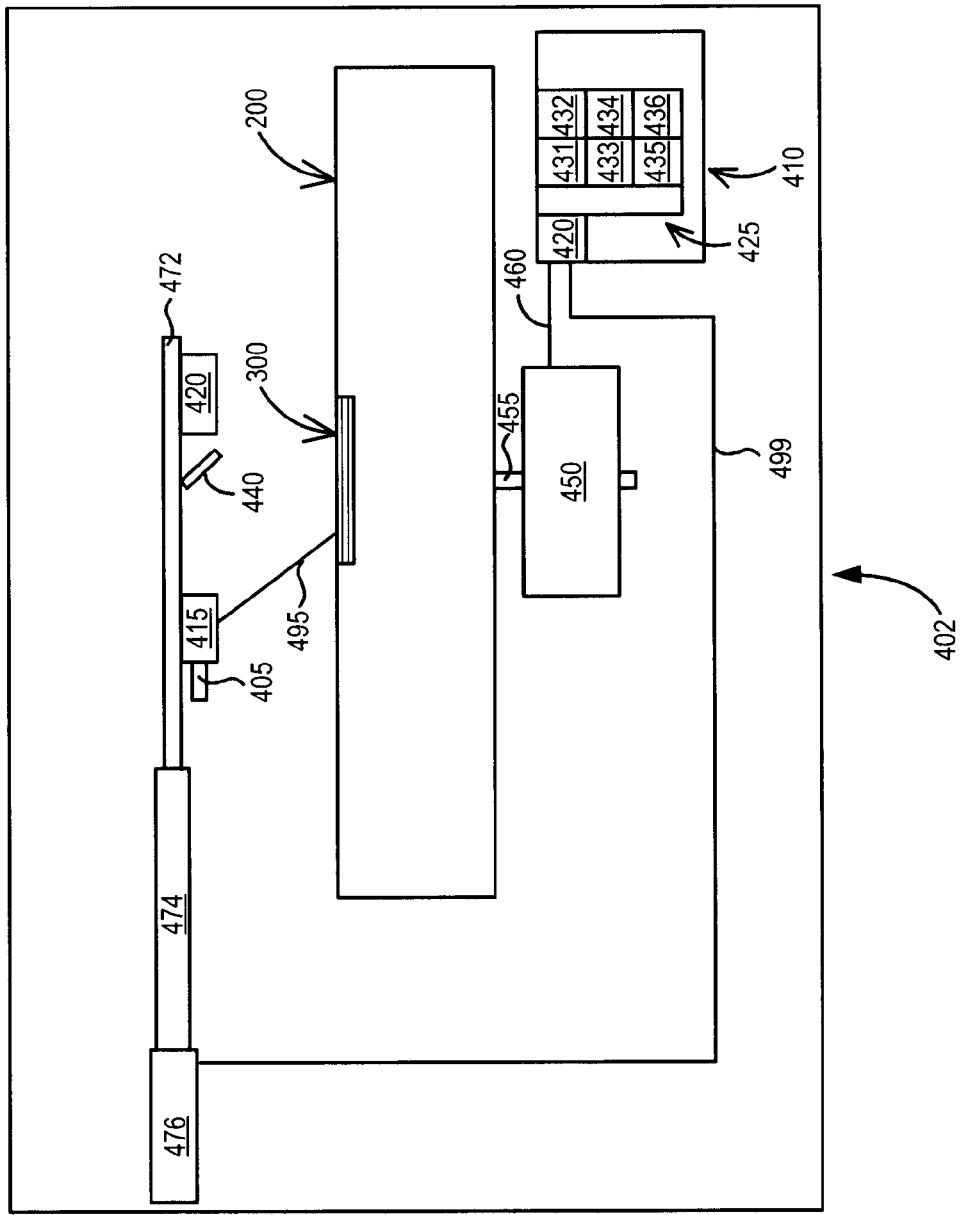
FIG. 4B is a block diagram showing a second embodiment of Applicants' drive apparatus comprising one lasing device.

FIG. 4B illustrates drive apparatus 402 wherein drive apparatus 402 comprises the elements of drive apparatus 400 (FIG. 4A), except drive apparatus 402 does not comprise second lasing device 480. FIG. 4B shows laser beam 495 being directed from beam splitter 415 onto Applicants' information layer laminate, such as laminate 300 (FIG. 3A), to perform steps 620 (FIG. 6) and 630 (FIG. 6). By varying the output power of laser beam 495, and/or varying the time that laser beam 495 is directed onto a selected portion of, for example, information layer laminate 300, drive controller 410 (FIGS. 4A, 4B, 4C, 4D, 5A, 5B, 5C) can selectively cause lasing device to ablate portions of first information layer 310 to display a portion of color layer 320, or to ablate a portion of both first color layer 310 and the underlying portion of second color layer 320 to display a portion of third color layer 330.

Figure 5A:
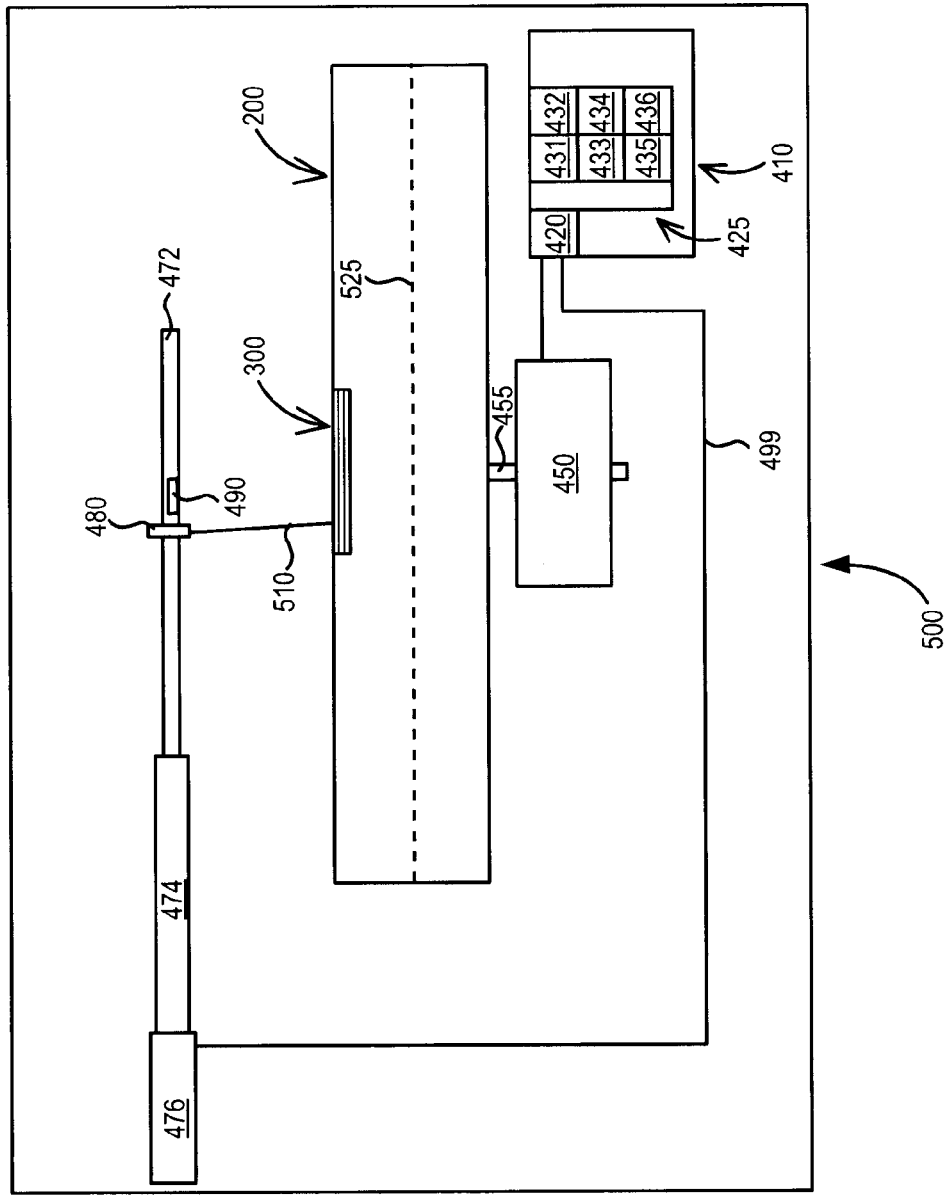
FIG. 5A is block diagram showing a third embodiment of Applicants' drive apparatus using Applicants' method to display information using Applicants' information layer laminate.

Referring now to FIG. 5A, drive apparatus 500 can be used with Applicants' information storage assembly 200 wherein data storage medium 220 comprises an optical storage layer 525. Drive apparatus 500 comprises optical head motor 476, member 474, member 472, lasing device 480 disposed on member 474, optical sensor 490 disposed on member 472, drive motor 450, and drive controller 410. FIG. 5A shows laser beam 510 being directed from lasing device 480 onto Applicants' information layer laminate, such as laminate 300 (FIG. 3A), to perform steps 620 (FIG. 6) and 630 (FIG. 6). By varying the output power of laser beam 510, and/or varying the time that laser beam 510 is incident on a selected portion of, for example, information layer laminate 300, drive controller 410 can selectively cause lasing device 480 to ablate portions of first information layer 310 to display a portion of color layer 320, or to ablate a portion of both first color layer 310 and the underlying portion of second color layer 320 to display a portion of third color layer 330.

Figure 4C:
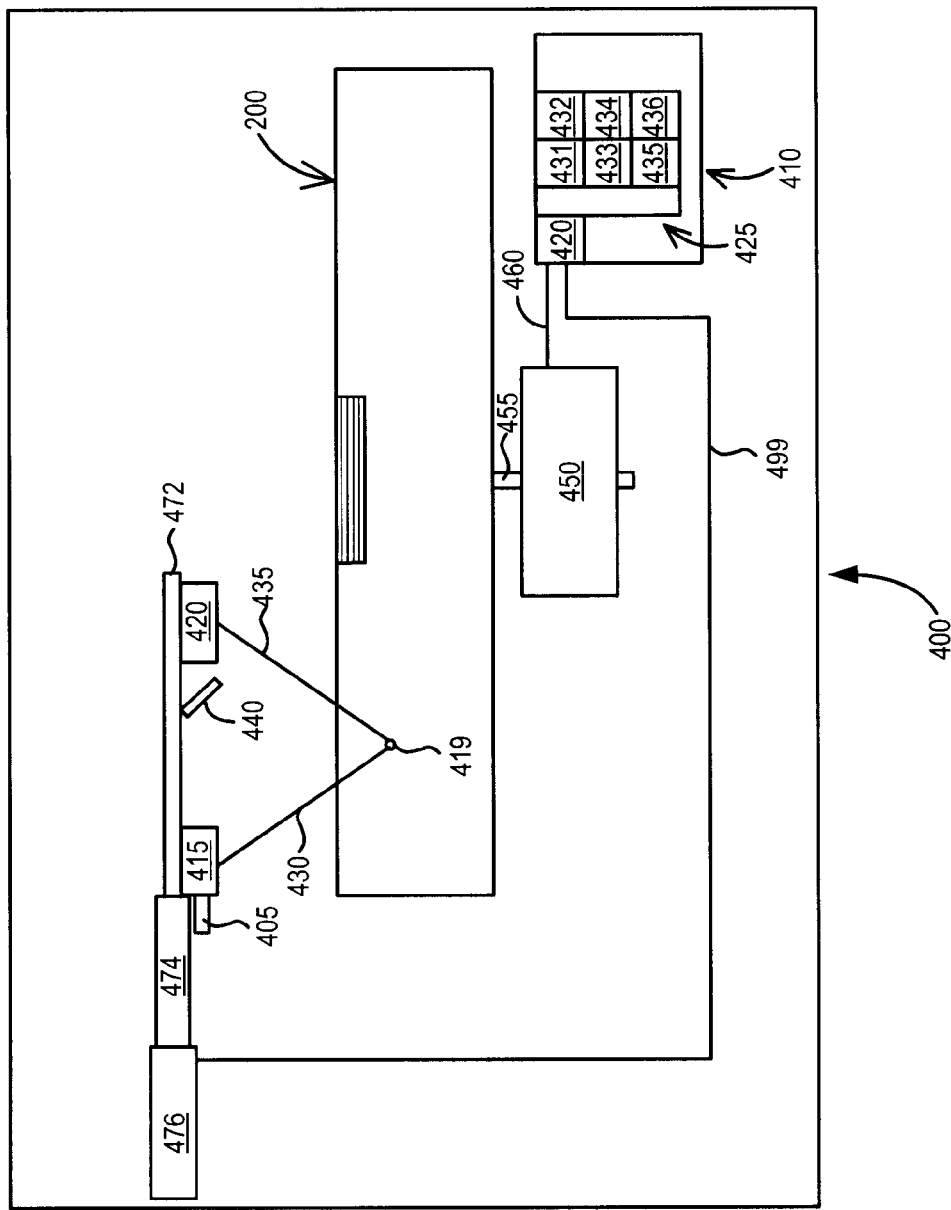
FIG. 4C is a block diagram showing the drive apparatus of FIG. 4A being used to read information encoded in a holographic data storage medium portion of the information storage assembly of FIGS. 2A and 2B.

In certain embodiments, drive apparatus 400, 402, or 500, are used to perform step 660 and/or step 670. Regarding performing step 660, FIGS. 4C and 5B shows drive apparatus 400 and 500, respectively, reading information encoded in data storage medium 220, wherein data storage medium 220 comprises a holographic data storage medium or an optical data storage layer, respectively. Referring now to FIG. 4C, in step 660 (FIG. 6) data drive 400 (FIGS. 4A, 4C, 4D) causes reference beam 430 to be projected onto an encoded interference pattern 419. As the reference beam 430 interacts with interference pattern 419, a reconstructed data beam 435 is generated, wherein that reconstructed data beam 435 comprises a reconstructed data image.

Figure 7:
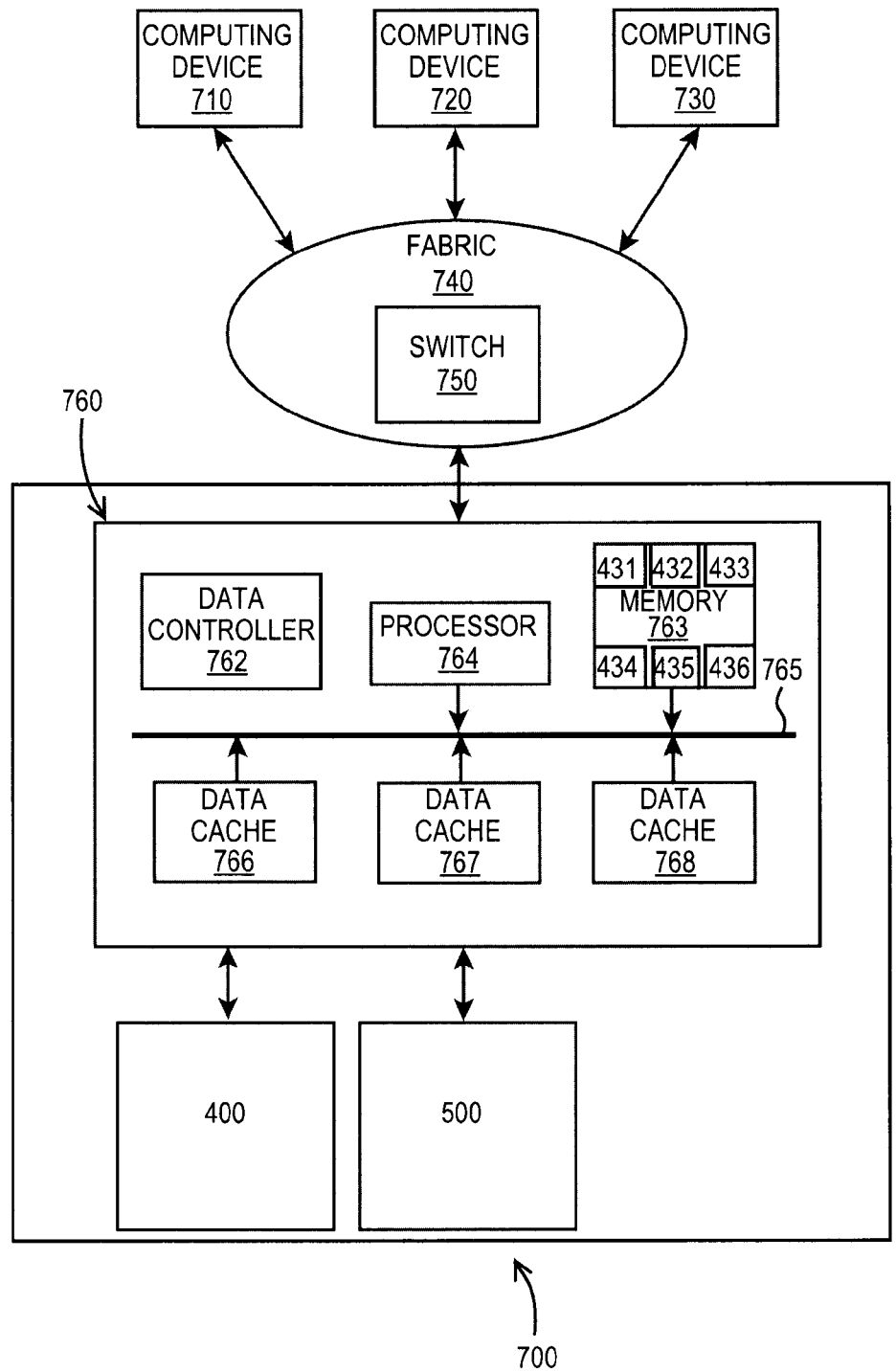
FIG. 7 is a block diagram showing one embodiment of Applicants' data storage and retrieval system.

Reconstructed data beam 435 is projected onto optical sensor 420. Optical sensor 420 comprises a plurality of detector elements. Optical sensor 420 digitally captures the information comprising the reconstructed data image of the reconstructed data beam 435, and provides that information to drive controller 410 (FIGS. 4A, 4B, 4C, 4D, 5A, 5B, 5C). In certain embodiments, in step 660 (FIG. 6) drive controller 410 provides the information to a storage controller, such as for example storage controller 760 (FIG. 7).

Referring now to FIG. 5B, in step 660 drive apparatus 500 (FIGS. 5A, 5B, 5C) utilizes lasing device 480 to read information from optical data storage layer 225. Lasing device 480, using laser beam 520, scans optical data storage layer 525. Drive controller 410 (FIGS. 4A, 4B, 4C, 4D, 5A, 5B, 5C) causes optical head 570 to move along one or more of the three orthogonal axes, and as that optical head 570 moves laser beam 520 is selectively reflected as reflected laser light 530. The three orthogonal axes are typically radial, tangential, and vertical, and comprise a cylindrical coordinate system (R,θ,Z). The radial direction is typically associated with optical head 570 seeking across data storage medium 120, and the vertical direction is often associated with focusing the light from lasing device 480. In step 660, sensor 490 detects the presence or absence of reflected laser light 530, and provides signals to data drive 410 (FIGS. 4A, 4B, 4C, 4D, 5A, 5B, 5C) and/or storage controller 760 (FIG. 7), to read information encoded in data storage layer 525 (FIGS. 5B, 5C).

Figure 4D:
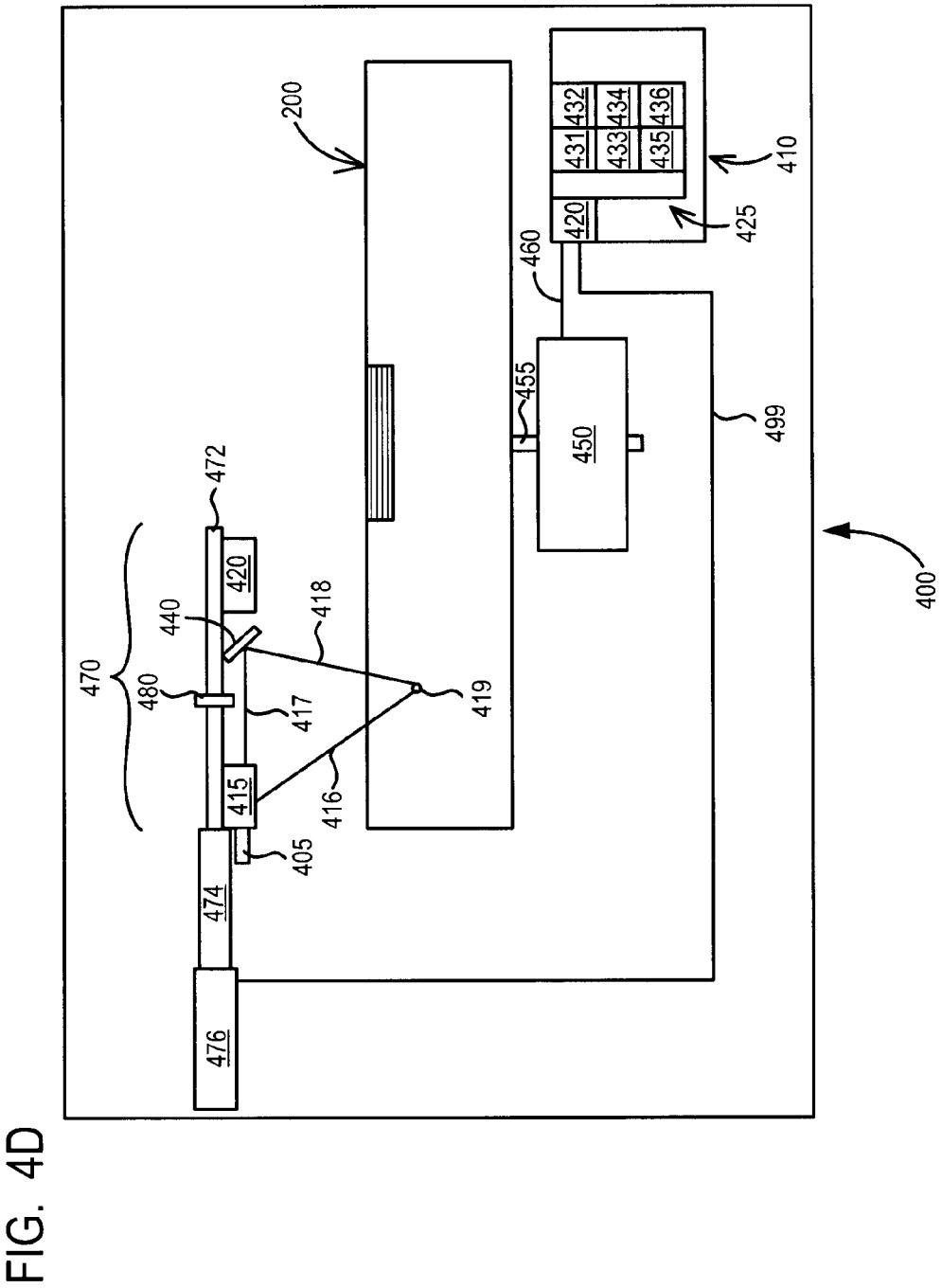
FIG. 4D is a block diagram showing the drive apparatus of FIG. 4A being used to encode information in a holographic data storage medium portion of the information storage assembly of FIGS. 2A and 2B.
Figure 5B:
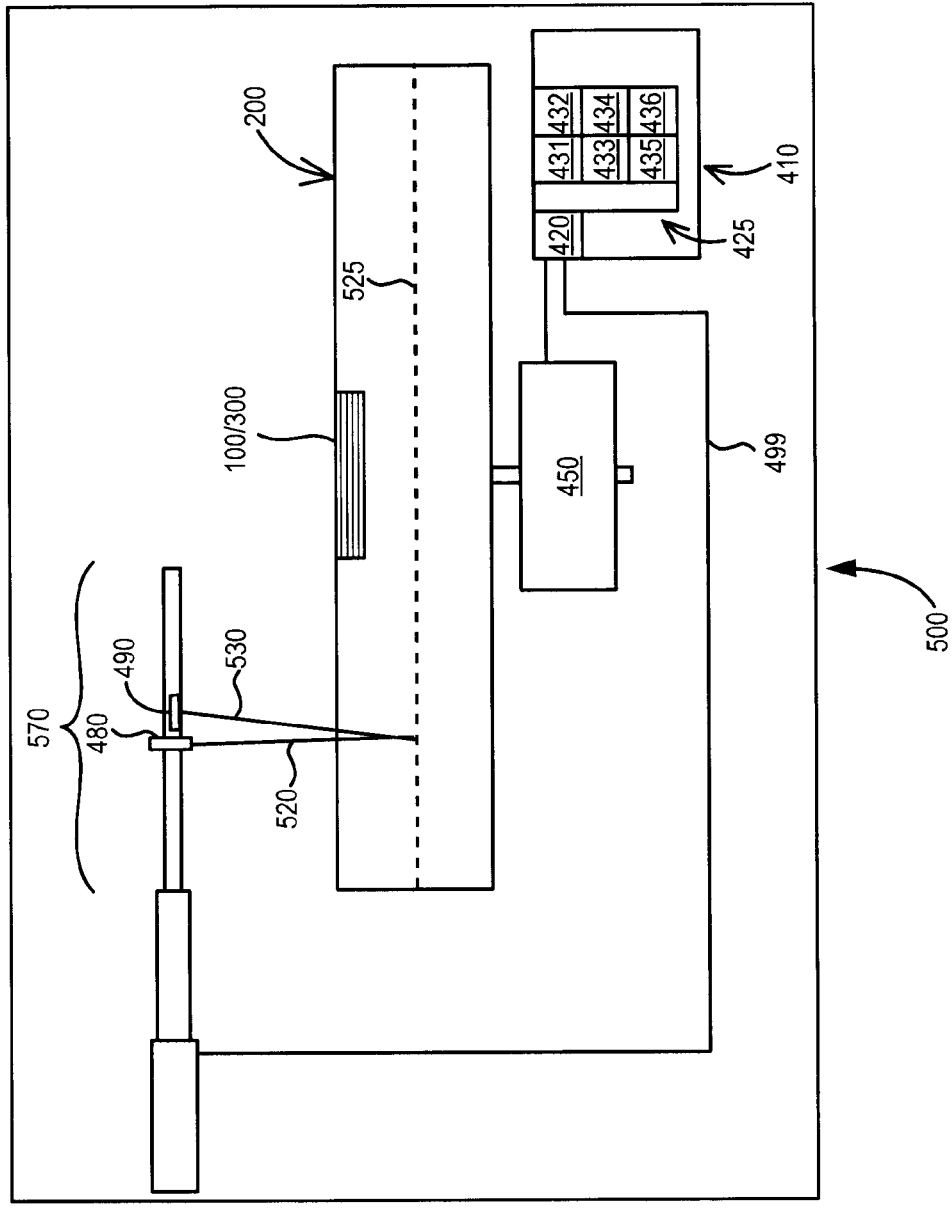
FIG. 5B is a block diagram showing the drive apparatus of FIG. 5A being used to read information encoded in an optical data storage layer portion of the information storage assembly of FIGS. 2A and 2B.
Figure 5C:
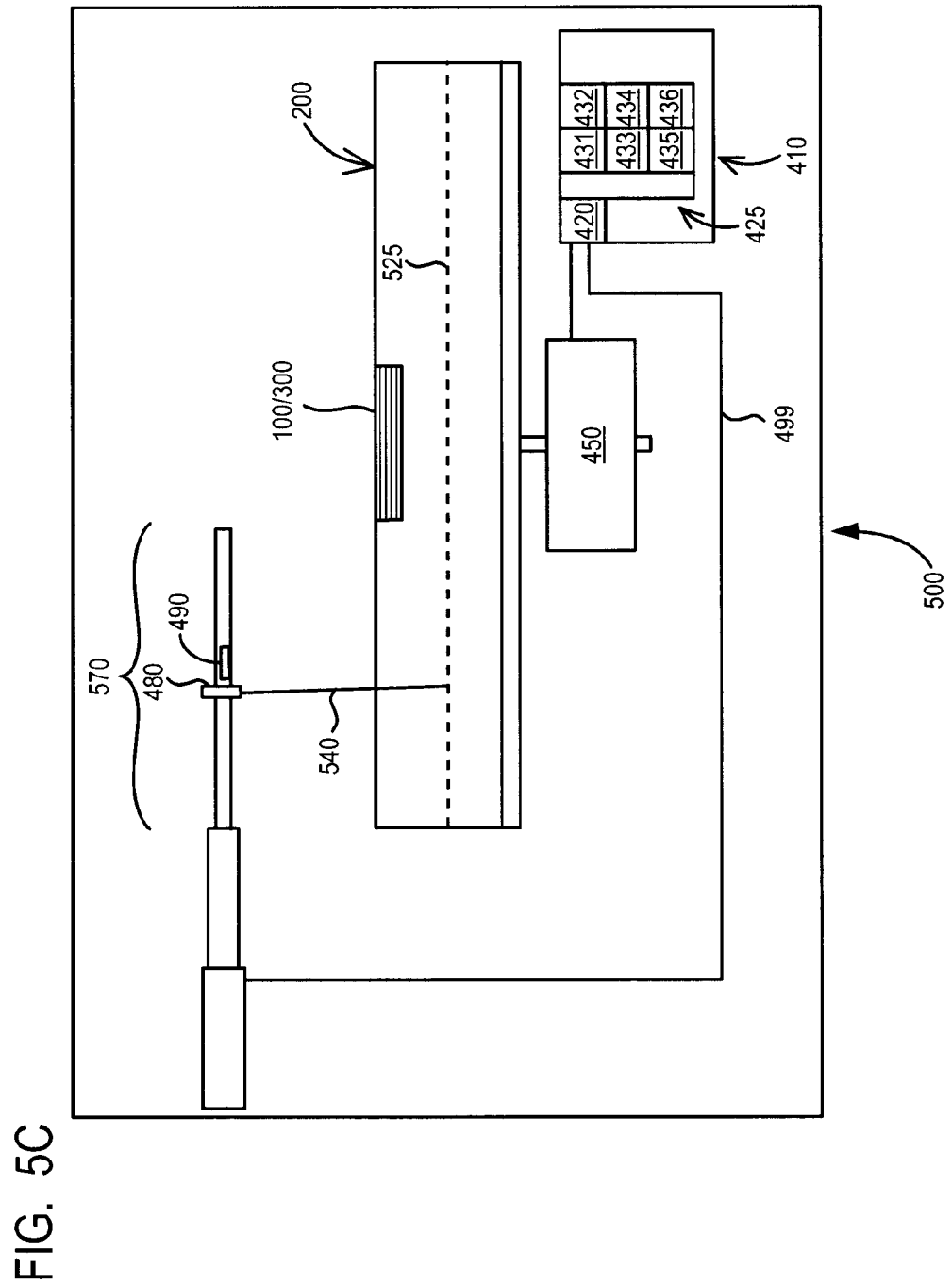
FIG. 5C is a block diagram showing the drive apparatus of FIG. 5A being used to write information to an optical data storage layer portion of the information storage assembly of FIGS. 2A and 2B.

Regarding performing step 670, FIGS. 4D and 5C show drive apparatus 400 and 500, respectively, writing information to data storage assembly 200, wherein data storage medium 220 comprises a holographic data storage medium or an optical data storage layer, respectively. FIG. 4D shows drive apparatus 400 (FIGS. 4A, 4C, 4D) being used to encode a hologram as interference pattern 419 (FIGS. 4C, 4D) in holographic data storage medium 220 (FIG.2A). The light generated by first lasing device 405 is split by beam splitter 415 into reference beam 416, and carrier beam 417.

A data image comprising information is displayed on reflective spatial light modulator (RSLM) 440. Carrier beam 417 is directed onto, and is reflected from, RSLM 440 to form reflected data beam 418 comprising the data image. Reference beam 416 interferes with data beam 418 to form a hologram. That hologram is encoded in holographic data storage medium 220 (FIG. 2A) as an interference pattern 419 (FIGS. 4C, 4D). That optical interference pattern causes chemical and/or physical changes in the photosensitive medium. The interference pattern is encoded within holographic data storage medium 220 as a change in the absorption, refractive index, and/or thickness of the photosensitive medium.

Referring now to FIG. 5C, in step 680 drive apparatus 500 (FIGS. 5A, 5B, 7) utilizes lasing device 480 and laser light 540 to write information to optical data storage layer 120 (FIG. 1). Drive controller 410 (FIGS. 4A, 4B, 4C, 4D, 5A, 5B, 5C) causes optical head 570 to move along one or more of the three orthogonal axes, and as optical head 570 moves the second laser light 582 incident on optical data storage medium 120 (FIG. 1). The three orthogonal axes are typically radial, tangential, and vertical, and comprise a cylindrical coordinate system (R,θ,Z).

FIG. 7 illustrates one embodiment of Applicants' data storage and retrieval system 700. In the illustrated embodiment of FIG. 7, data storage and retrieval system 700 communicates with computing devices 710, 720, and 730. In the illustrated embodiment of FIG. 7, computing devices 710, 720 and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage and retrieval system 700 comprises drive apparatus 400 (FIGS. 4A, 4B, 4C, 4D) and drive apparatus 500 (FIGS. 5A, 5B, 5C).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, Gigabit Ethernet, Fibre Channel over Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, instructions 436 encoded in memory 763, first laser energy 431 encoded in memory 763, second laser energy 432 encoded in memory 763, third laser energy 433 encoded in memory 763, fourth laser energy 434 encoded in memory 763, and fifth laser energy 435 encoded in memory 763, processor 764, and data caches 766, 767, and 768, wherein these components communicate through a data bus 765. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

Figure 8B:
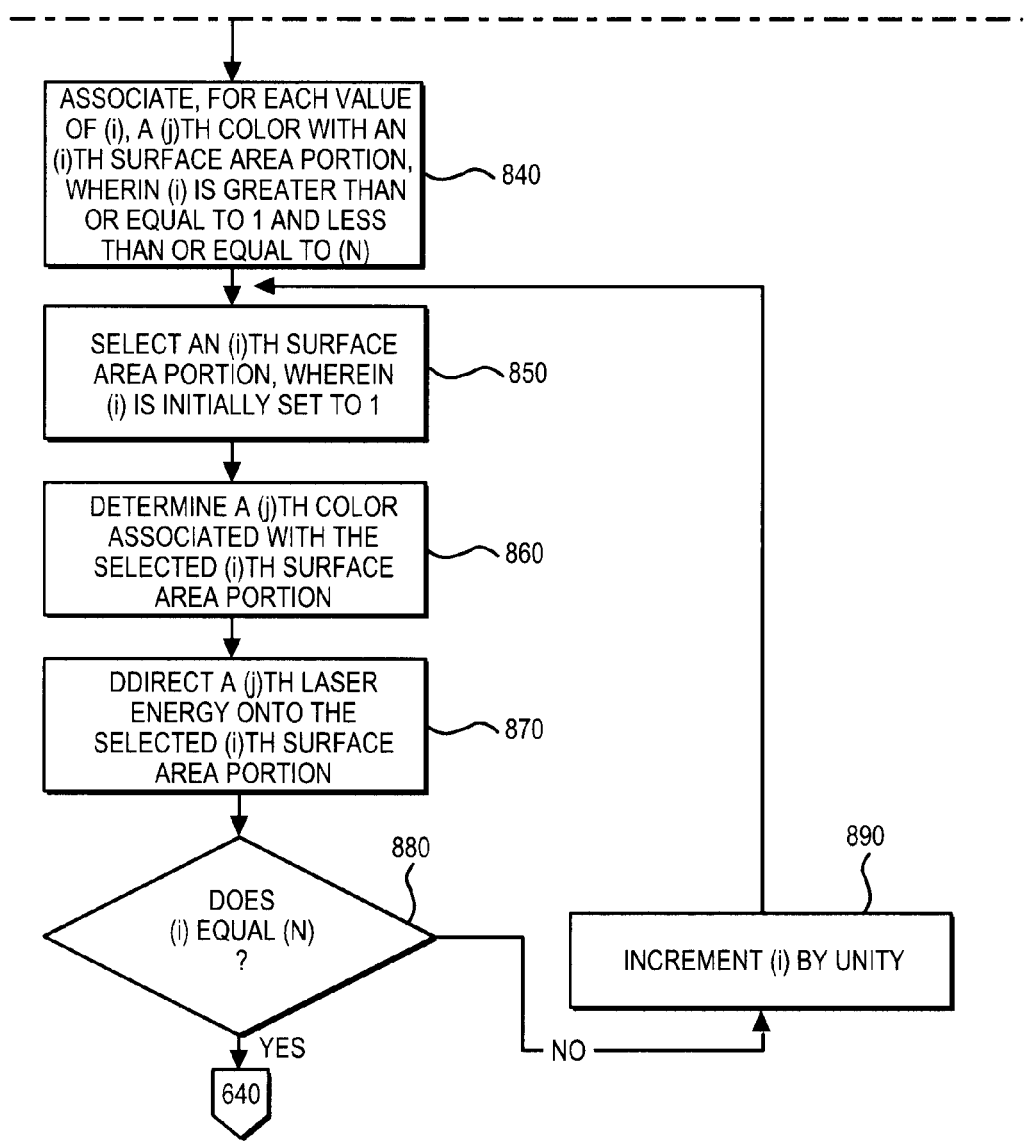
FIG. 8B is a flow chart summarizing certain additional steps of Applicants' method.

Referring now to FIGS. 6 and 8, in certain embodiments steps 620 and 630 recited in FIG. 6 comprise steps 810 through 890, inclusive, recited in FIGS. 8A and 8B, wherein the information layer laminate comprises a surface area and (M) information layers each comprising a different color, as recited in step 805. In step 810 the method supplies a lasing device capable of emitting a laser beam having a cross-section comprising an ablating surface area. In certain embodiments, the lasing device of step 810 is disposed in a drive apparatus, such as for example drive apparatus 400 (FIGS. 4A, 4C, 4D) or drive apparatus 500 (FIGS. 5A, 5B, 5C, 7).

In step 820, the method defines, for each value of (j), a (j)th laser energy comprising a (j)th power, wherein (j) is greater than or equal to 1 and less than or equal to (M), wherein a first laser energy comprises 0 watts power. Referring to FIGS. 4A, 4B, 4C, and 4D, drive apparatus 400 (FIGS. 4A, 4C, 4D) comprises first laser energy 431 (FIGS. 4A, 4B, 4C, 4D, 5A, 5B, 5C), second laser energy 432 (FIGS. 4A, 4B, 4C, 4D, 5A, 5B, 5C), third laser energy 433 (FIGS. 4A, 4B, 4C, 4D, 5A, 5B, 5C), fourth laser energy 434 (FIGS. 4A, 4B, 4C, 4D, 5A, 5B, 5C), and fifth laser energy 435 (FIGS. 4A, 4B, 4C, 4D, 5A, 5B, 5C), encoded in memory 425 (FIGS. 4A, 4B, 4C, 4D, 5A, 5B, 5C) disposed in drive controller 410 (FIGS. 4A, 4B, 4C, 4D, 5A, 5B, 5C). Referring to FIGS. 5A, 5B, and 5C, drive apparatus 500 (FIGS. 5A, 5B, 5C) comprises first laser energy 431 (FIGS. 4A, 4B, 4C, 4D, 5A, 5B, 5C), second laser energy 432 (FIGS. 4A, 4B, 4C, 4D, 5A, 5B, 5C), third laser energy 433 (FIGS. 4A, 4B, 4C, 4D, 5A, 5B, 5C), fourth laser energy 434 (FIGS. 4A, 4B, 4C, 4D, 5A, 5B, 5C), and fifth laser energy 435 (FIGS. 4A, 4B, 4C, 4D, 5A, 5B, 5C), encoded in memory 425 (FIGS. 4A, 4B, 4C, 4D, 5A, 5B, 5C) disposed in drive controller 410 (FIGS. 4A, 4B, 4C, 4D, 5A, 5B, 5C).

In certain embodiments, the method in step 820 sets, for each value of (j), a (j)th laser power per second. In certain embodiments, the method in step 820 sets, for each value of (j), a (j)th time interval. As those skilled in the art will appreciate, a (j)th laser energy comprises the multiplication product of the (j)th power per second and the (j)th time interval in seconds.

In certain embodiments, step 820 is performed by a computing device, such as one or more of computing devices 710 (FIG. 7), 720 (FIG. 7), and/or 730 (FIG. 7). In certain embodiments, step 820 is performed by a storage controller, such as for example storage controller 760 (FIG. 7). In certain embodiments, step 820 is performed by a drive controller, such as for example drive controller 410 (FIGS. FIGS. 4A, 4B, 4C, 4D, 5A, 5B, 5C).

Figure 3B:
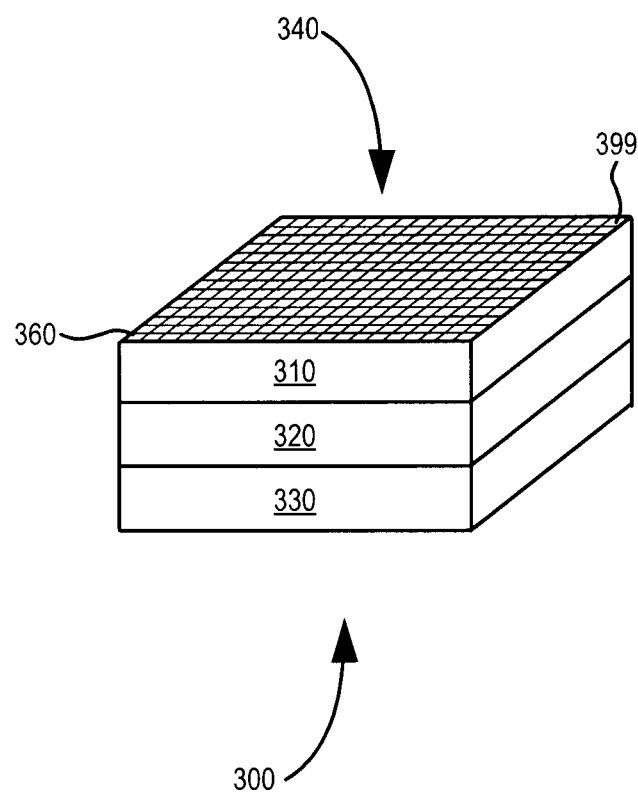
FIG. 3B is a perspective view of the information layer laminate of FIG. 3A wherein a top surface has been divided into a plurality of surface area portions.

In step 830, the method divides the information layer laminate surface area by the ablating surface area to define (N) surface area portions. For example and referring to FIG. 3A, top surface 340 of information layer laminate 300 comprises surface area 350. Referring to FIG. 3B, surface area 350 is shown divided into surface area portions starting with surface area portion 360 and ending with surface area portion 399, wherein each surface area portion comprises an ablating surface area.

In certain embodiments, step 830 is performed by a computing device, such as one or more of computing devices 710 (FIG. 7), 720 (FIG. 7), and/or 730 (FIG. 7). In certain embodiments, step 830 is performed by a storage controller, such as for example storage controller 760 (FIG. 7). In certain embodiments, step 830 is performed by a drive controller, such as for example drive controller 410 (FIGS. FIGS. 4A, 4B, 4C, 4D, 5A, 5B, 5C).

In step 840, the method, for each value of (i), associates an (i)th surface area portion, such as for example surface area portion 360 (FIG. 3B), with a (j)th color, wherein (i) is greater than or equal to 1 and less than or equal to (N). In certain embodiments, step 840 is performed by a computing device, such as one or more of computing devices 710 (FIG. 7), 720 (FIG. 7), and/or 730 (FIG. 7). In certain embodiments, step 840 is performed by a storage controller, such as for example storage controller 760 (FIG. 7). In certain embodiments, step 840 is performed by a drive controller, such as for example drive controller 410 (FIGS. 4A, 4B, 4C, 4D, 5A, 5B, 5C).

In step 850, the method selects an (i)th surface area portion, wherein (i) is initially set to 1. In certain embodiments, step 850 is performed by a computing device, such as one or more of computing devices 710 (FIG. 7), 720 (FIG. 7), and/or 730 (FIG. 7). In certain embodiments, step 850 is performed by a storage controller, such as for example storage controller 760 (FIG. 7). In certain embodiments, step 850 is performed by a drive controller, such as for example drive controller 410 (FIGS. 4A, 4B, 4C, 4D, 5A, 5B, 5C).

In step 860, the method determines a (j)th color associated with the selected (i)th surface area portion of step 850. In certain embodiments, step 860 is performed by a computing device, such as one or more of computing devices 710 (FIG. 7), 720 (FIG. 7), and/or 730 (FIG. 7). In certain embodiments, step 860 is performed by a storage controller, such as for example storage controller 760 (FIG. 7). In certain embodiments, step 860 is performed by a drive controller, such as for example drive controller 410 (FIGS. 4A, 4B, 4C, 4D, 5A, 5B, 5C).

In step 870, the method directs (j)th laser energy onto the selected (i)th surface area portion of step 850. In certain embodiments, step 870 is performed by a computing device, such as one or more of computing devices 710 (FIG. 7), 720 (FIG. 7), and/or 730 (FIG. 7). In certain embodiments, step 870 is performed by a storage controller, such as for example storage controller 760 (FIG. 7). In certain embodiments, step 870 is performed by a drive controller, such as for example drive controller 410 (FIGS. 4A, 4B, 4C, 4D, 5A, 5B, 5C).

In step 880, the method determines if each surface area portion of the information layer laminate has been processed, i.e. if (i) equals (N). In certain embodiments, step 880 is performed by a computing device, such as one or more of computing devices 710 (FIG. 7), 720 (FIG. 7), and/or 730 (FIG. 7). In certain embodiments, step 870 is performed by a storage controller, such as for example storage controller 760 (FIG. 7). In certain embodiments, step 880 is performed by a drive controller, such as for example drive controller 410 (FIGS. 4A, 4B, 4C, 4D, 5A, 5B, 5C).

If the method determines in step 880 that (i) does equal (N), then the method transitions from step 880 to step 640 and continues as described herein. Alternatively, if the method determines in step 880 that (i) does not equal (N), then the method transitions from step 880 to step 890 wherein the method increments (i) by unity. The method transitions from step 890 to step 850 and proceeds as described herein. In certain embodiments, step 890 is performed by a computing device, such as one or more of computing devices 710 (FIG. 7), 720 (FIG. 7), and/or 730 (FIG. 7). In certain embodiments, step 890 is performed by a storage controller, such as for example storage controller 760 (FIG. 7). In certain embodiments, step 890 is performed by a drive controller, such as for example drive controller 410 (FIGS. 4A, 4B, 4C, 4D, 5A, 5B, 5C).

The following example is presented to further illustrate to persons skilled in the art how to make and use the invention. This example is not intended as a limitation, however, upon the scope of the invention, as set forth by claims recited hereinbelow.

EXAMPLE

Figure 3C:
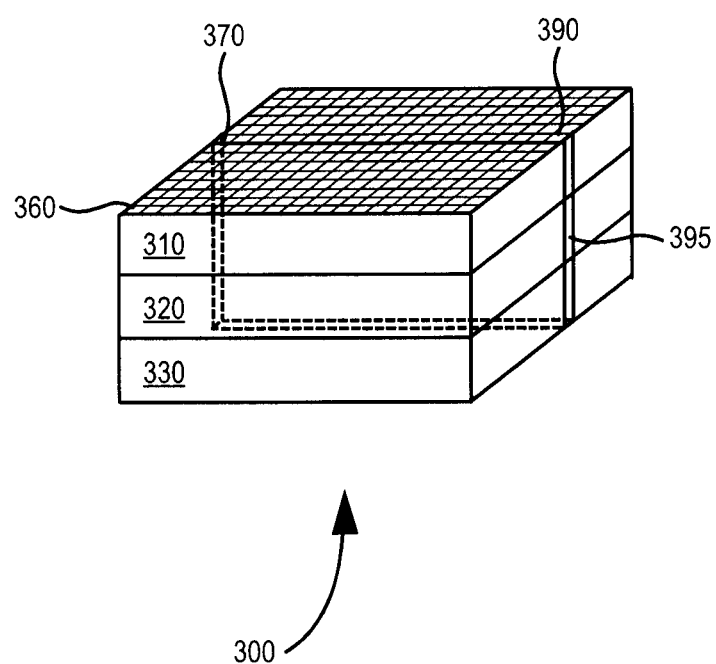
FIG. 3C shows a cross-sectional slice of the information layer laminate of FIG. 3A.
Figure 3D:
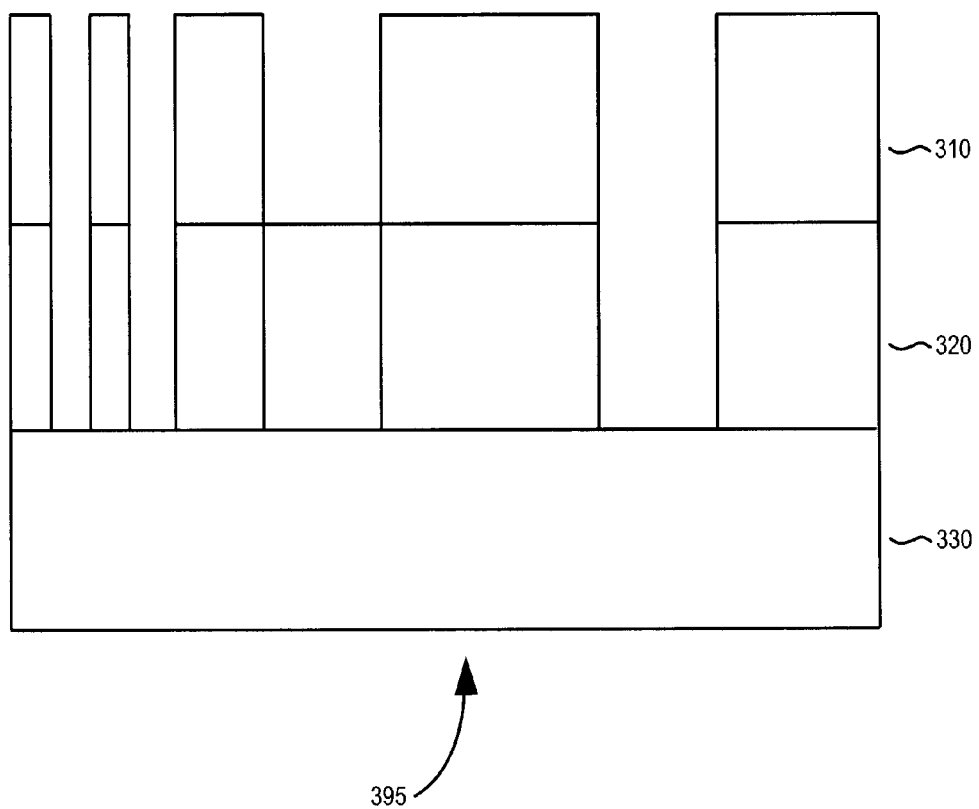
FIG. 3D is a side view of the cross-sectional slice of FIG. 3C after the information layer laminate of FIG. 3A has been processed to display information using Applicants' method.

As an example and referring now to FIG. 3B, top surface 340 of information layer laminate 300 is shown divided into a plurality of surface area portions. Referring now to FIGS. 3B and 3C, surface area portions 370 through 390 define the top of cross-sectional slice 395 of information layer laminate 300. FIG. 3D shows a side view of slice 395 after processing using Applicants' method. Surface area portions 370, 372, 374, 375, 379, 380, 381, 382, 383, 387, 388, 389, and 390, were exposed to first laser energy comprising 0 watts, meaning that no ablation took place at those surface area portions, and therefore, those surface area portions display the first color layer 310.

Surface area portions 376, 377, and 378, were exposed to second laser energy which removed the first color layer 310. As a result, surface area portions 376, 377, and 378, display the second color layer 320. Surface area portions 371, 373, 384, 385, and 386, were exposed to third laser energy which removed first color layer 310 and second color layer 320. As a result, surface area portions 371, 373, 384, 385, and 386, display third color layer 330.

In certain embodiments, individual steps recited in FIGS. 6, 8A and/or 8B, may be combined, eliminated, or reordered.

In certain embodiments, Applicants' invention includes instructions, such as instructions 436 (FIGS. 4A, 4B, 4C, 4D, 5A, 5B, 5C, 7), encoded in memory 425 (FIGS. 4A, 4B, 4C, 4D, 5A, 5B, 5C) and/or instructions memory 763 (FIG. 7), where those instructions are executed by a processor, such as processor 420 (FIGS. 4A, 4B, 4C, 4D, 5A, 5B, 5C) and/or processor 764 (FIG. 7), to perform one or more of steps 620, 630, 650, 660, 670, and/or 680, recited in FIG. 6, and/or one or more of steps 820, 830, 840, 850, 860, 870, 880, and/or 890, recited in FIGS. 8A and 8B.

In certain embodiments, Applicants' invention includes instructions residing in any other computer program product, where those instructions are executed by a computer external to, or internal to data drive 400 (FIGS. 4A, 4C, 4D), and/or data drive 500 (FIGS. 5A, 5B, 5C, 7), and/or data storage and retrieval system 700 (FIG. 7), to perform one or more of steps 620, 630, 650, 660, 670, and/or 680, recited in FIG. 6, and/or one or more of steps 820, 830, 840, 850, 860, 870, 880, and/or 890, recited in FIGS. 8A and 8B. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to display information, comprising the steps of:
   supplying an information storage assembly comprising a data storage medium comprising a data storage layer and having a first top surface, and an information layer laminate having a second top surface and comprising five color layers each comprising a different color, wherein three of said five colors each comprise a different primary color, and wherein a fourth color comprises black, and wherein a fifth color comprises white, and wherein said first top surface is contiguous with said second top surface;
   supplying a drive apparatus comprising a lasing device;
   disposing said information storage assembly in said drive apparatus such that said information layer laminate faces said lasing device;
   directing laser energy from said lasing device through said first top surface of said data storage medium to encode information in said data storage layer;
   without flipping said information storage assembly over, directing laser energy from said lasing device through said second top surface of said information layer laminate to selectively remove portions of a first color layer to display portions of a second color layer using said lasing device;
   selectively removing portions of said first color layer and said second color layer to display portions of a third color layer.

2. The method of claim 1, wherein:
   said second top surface comprises a surface area;
   said selectively removing steps comprise the steps of:
   defining an ablating surface area, and a laser energy to ablate an aperture having a cross-section comprising said ablating surface area through a selected layer but not through a layer underlying said selected layer;
   dividing said surface area by said ablating surface area to define a plurality of second surface area portions;
   selecting one of said plurality of second surface area portions;
   determining a color associated with said selected surface area portion;
   directing laser energy from said lasing device onto said selected second surface area portion.

3. The method of claim 2, wherein said supplying an information storage assembly comprises supplying an information storage assembly comprising an optical storage layer.

4. The method of claim 3, further comprising the step of decoding data encoded in said optical storage layer using said lasing device.

5. The method of claim 4, further comprising the step of encoding data in said optical storage layer using said lasing device.

6. The method of claim 2, wherein said supplying an information storage assembly comprises supplying an information storage assembly comprising a holographic data storage medium.

7. The method of claim 6, further comprising the step of writing data to said holographic data storage medium using said lasing device.

8. An article of manufacture comprising a processor, a lasing device and a computer readable medium having computer readable program code disposed therein to display information using an information storage assembly comprising a data storage medium comprising a data storage layer, and having a first top surface and an information layer laminate having a second top surface and comprising five color layers each comprising a different color, wherein three of said five colors each comprise a different primary color, and wherein a fourth color comprises black, and wherein a fifth color comprises white, and wherein said first top surface is contiguous with said second top surface, and wherein said information storage assembly is disposed in said drive apparatus such that said second top surface faces said lasing device, the computer readable program code comprising a series of computer readable program steps to effect:
   directing laser energy provided by said lasing device through said first top surface of said data storage medium to encode information in said data storage layer;
   without flipping said information storage assembly over, directing laser energy produced by said lasing device through said second top surface to selectively remove portions of a first color layer to display portions of a second color layer;
   selectively removing portions of said first color layer and said second color layer to display portions of a third color layer.

9. The article of manufacture of claim 8, wherein said computer readable program code to effect selectively removing portions of said first color layer and portions of said second color layer further comprises a series of computer readable program steps to effect:
   defining an ablating surface area-and a laser energy to ablate an aperture having a cross-section comprising said ablating surface area through a selected layer but not through an underlying said selected layer;
   dividing said second surface area by said ablating surface area to define a plurality of second surface area portions;
   selecting one of said plurality of second surface area portions;
   determining a color associated with said selected second surface area portion;
   directing laser energy from said lasing device onto said selected second surface area portion.

10. The article of manufacture of claim 9, wherein said data storage medium comprises an optical storage layer.

11. The article of manufacture of claim 10, said computer readable program code further comprising a series of computer readable program steps to effect decoding data encoded in said optical storage layer using said lasing device.

12. The article of manufacture of claim 11, said computer readable program code further comprising a series of computer readable program steps to effect encoding data in said optical storage layer using said lasing device.

13. The article of manufacture of claim 9, wherein said information storage assembly comprises a holographic data storage medium.

14. The article of manufacture of claim 13, said computer readable program code further comprising a series of computer readable program steps to effect encoding data to said holographic data storage medium using said lasing device.

* * * * *